(12) United States Patent
Seo

(10) Patent No.: US 9,510,339 B2
(45) Date of Patent: Nov. 29, 2016

(54) METHOD FOR TRANSCEIVING SIGNAL VIA INTERFERENCE MEASUREMENT IN WIRELESS COMMUNICATION SYSTEM WITH COOPERATIVE BASE STATIONS, AND APPARATUS THEREFOR

(71) Applicant: LG ELECTRONICS INC., Seoul (KR)

(72) Inventor: Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/405,356

(22) PCT Filed: Jun. 18, 2013

(86) PCT No.: PCT/KR2013/005350
§ 371 (c)(1),
(2) Date: Dec. 3, 2014

(87) PCT Pub. No.: WO2013/191437
PCT Pub. Date: Dec. 27, 2013

(65) Prior Publication Data
US 2015/0156751 A1    Jun. 4, 2015

Related U.S. Application Data

(60) Provisional application No. 61/661,790, filed on Jun. 19, 2012.

(51) Int. Cl.
*H04W 72/04* (2009.01)
*H04B 17/00* (2015.01)
(Continued)

(52) U.S. Cl.
CPC .......... *H04W 72/042* (2013.01); *H04B 7/024* (2013.01); *H04B 7/0617* (2013.01); *H04B 17/00* (2013.01); *H04L 5/0035* (2013.01); *H04W 24/10* (2013.01); *H01Q 3/00* (2013.01); *H04B 7/0417* (2013.01); *H04B 7/0469* (2013.01); *H04B 7/0626* (2013.01); *H04B 7/0632* (2013.01); *H04L 5/0044* (2013.01); *H04L 5/0048* (2013.01); *H04L 5/0053* (2013.01); *H04L 5/0073* (2013.01); *H04W 72/0406* (2013.01); *H04W 72/0453* (2013.01)

(58) Field of Classification Search
None
See application file for complete search history.

(56) References Cited

U.S. PATENT DOCUMENTS

2007/0253503 A1 * 11/2007 Kim .................... H03M 13/256
375/265
2009/0081955 A1    3/2009 Necker
(Continued)

FOREIGN PATENT DOCUMENTS

KR    10-2008-0074419 A    8/2008
KR    10-2010-0027945 A    3/2010
(Continued)

*Primary Examiner* — Andrew Oh
(74) *Attorney, Agent, or Firm* — Birch, Stewart, Kolasch & Birch, LLP

(57) ABSTRACT

Disclosed is a method for a first base station for transmitting a signal to a terminal in a wireless communication system. The method comprises the steps of: receiving, from a second base station, information related to a plurality of interference measurement resources; applying beamformings corresponding to the plurality of interference measurement resources; transmitting, to the terminal, information that downlink data signal does not get mapped in the plurality of interference measurement resources; and transmitting a downlink signal independent of the beamformings to the terminal from a resource domain which excludes the plurality of interference measurement resources.

9 Claims, 15 Drawing Sheets

(51) Int. Cl.
  *H04B 7/02*   (2006.01)
  *H04W 24/10*  (2009.01)
  *H04B 7/04*       (2006.01)
  *H04B 7/06*       (2006.01)
  *H04L 5/00*       (2006.01)
  *H01Q 3/00*       (2006.01)

(56) References Cited

U.S. PATENT DOCUMENTS

| | | | | |
|---|---|---|---|---|
| 2011/0230144 A1* | 9/2011 | Siomina | H04L 5/0048 | 455/68 |
| 2011/0319092 A1 | 12/2011 | Kim et al. | | |
| 2012/0002596 A1* | 1/2012 | Kim | H04B 7/0413 | 370/315 |
| 2012/0076025 A1* | 3/2012 | Barbieri | H04L 5/0023 | 370/252 |
| 2012/0087299 A1* | 4/2012 | Bhattad | H04L 5/0053 | 370/315 |
| 2012/0106374 A1* | 5/2012 | Gaal | H04L 5/0048 | 370/252 |
| 2012/0120903 A1* | 5/2012 | Kim | H04B 7/024 | 370/329 |
| 2012/0177139 A1* | 7/2012 | Anto | H04L 1/0606 | 375/267 |
| 2012/0207043 A1* | 8/2012 | Geirhofer | H04L 5/0048 | 370/252 |
| 2012/0207126 A1* | 8/2012 | Qu | H04L 5/005 | 370/330 |
| 2012/0213261 A1* | 8/2012 | Sayana | H04L 5/0094 | 375/224 |
| 2012/0220327 A1* | 8/2012 | Lee | H04W 72/1273 | 455/509 |
| 2012/0264441 A1* | 10/2012 | Chandrasekhar | H04L 5/0073 | 455/450 |
| 2013/0028182 A1* | 1/2013 | Geirhofer | H04B 7/0626 | 370/328 |
| 2013/0089040 A1* | 4/2013 | Tabet | H04L 5/0073 | 370/329 |
| 2013/0223264 A1* | 8/2013 | Miki | H04L 5/0053 | 370/252 |
| 2013/0230013 A1* | 9/2013 | Seo | H04L 27/2602 | 370/329 |
| 2013/0258976 A1* | 10/2013 | Nagata | H04W 24/10 | 370/329 |
| 2013/0322350 A1* | 12/2013 | Gaur | H04L 1/0013 | 370/329 |
| 2013/0329772 A1* | 12/2013 | Wernersson | H01Q 3/00 | 375/219 |
| 2013/0344909 A1* | 12/2013 | Davydov | H04B 7/0689 | 455/501 |
| 2014/0112303 A1* | 4/2014 | Popovic | H04L 5/0044 | 370/330 |
| 2014/0113677 A1* | 4/2014 | Parkvall | H04W 52/146 | 455/522 |
| 2014/0119334 A1* | 5/2014 | Kazmi | H04L 5/0032 | 370/330 |
| 2014/0204853 A1* | 7/2014 | Ko | H04L 5/0073 | 370/329 |
| 2014/0219152 A1* | 8/2014 | Ant | H04W 52/08 | 370/311 |
| 2014/0321359 A1* | 10/2014 | Seo | H04L 5/0057 | 370/328 |
| 2015/0049621 A1* | 2/2015 | Liu | H04L 5/0048 | 370/252 |

FOREIGN PATENT DOCUMENTS

| | | |
|---|---|---|
| KR | 10-2010-0110965 A | 10/2010 |
| KR | 10-2011-0080241 A | 7/2011 |
| WO | WO 2011/087227 A2 | 7/2011 |

* cited by examiner (A) CONTROL-PLANE PROTOCOL STACK (B) USER-PLANE PROTOCOL STACK

FIG. 8

☐ : DMRS GROUP 1

☐ : DMRS GROUP 2

METHOD FOR TRANSCEIVING SIGNAL VIA INTERFERENCE MEASUREMENT IN WIRELESS COMMUNICATION SYSTEM WITH COOPERATIVE BASE STATIONS, AND APPARATUS THEREFOR

CROSS REFERENCE TO RELATED APPLICATIONS

This application is the National Phase of PCT International Application No. PCT/KR2013/005350, filed on Jun. 18, 2013, which claims priority under 35 U.S.C. 119(e) to U.S. Provisional Application No. 61/661,790, filed on Jun. 19, 2012, all of which are hereby expressly incorporated by reference into the present application.

TECHNICAL FIELD

The present invention relates to a wireless communication system, and more particularly, to a method and apparatus for transmitting and receiving a signal via interference measurement in a wireless communication system with cooperative base stations.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

An object of the present invention devised to solve the problem lies in a method and apparatus for transmitting and receiving a signal via interference measurement in a wireless communication system with cooperative base stations.

Technical Solution

The object of the present invention can be achieved by providing a method for transmitting a signal to a user equipment (UE) by a first base station (BS) in a wireless communication system, the method including receiving information about a plurality of interference measurement resources from a second BS, applying beamformings corresponding to the plurality of interference measurement resources, transmitting information indicating that a downlink data signal is not mapped in the plurality of interference measurement resources, to the UE, and transmitting an independent downlink signal from the beamformings to the UE, in a resource region except for the plurality of interference measurement resources. The method may further include applying corresponding beamforming and transmitting a dummy signal, in each of the plurality of interference measurement resources. In addition, the first BS may be a transmission point that causes interference, and the second BS may be an interfered transmission point.

The beamformings corresponding to the plurality of interference measurement resources may be applied in different directions and different ranges.

The method may further include transmitting information about a data transmission resource in which the same level of interference as interference measured in the plurality of interference measurement resources is assumed, to the second BS. Here, the information about the data transmission resource may include subframe patter information.

In this case, the second BS may receive interference information measured by a corresponding UE in the plurality of interference measurement resources, and transmit a downlink data signal to the corresponding UE using the interference information in the data transmission resource. In addition, the method may further include transmitting information about whether interference at a sub-band of the plurality of interference measurement resources is assumed to be the same as interference at a sub-band level of the data transmission resource, to the second BS.

The plurality of interference measurement resources may be represented as resources for zero power channel state information-RS (CSI-RS) and received via a backhaul link with the second BS.

Advantageous Effects

According to embodiments of the present invention, a user equipment (UE) and a base station (BS) can effectively transmit and receive a signal via interference measurement in a wireless communication system with cooperative base stations.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

FIGS. 8 and 9 illustrate RS configurations in an LTE system supporting DL transmission through four antennas.

BEST MODE

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

And, in the present specification, a base station can be named by such a comprehensive terminology as an RRH (remote radio head), an eNB, a TP (transmission point), an RP (reception point), a relay and the like.

Figure 1:
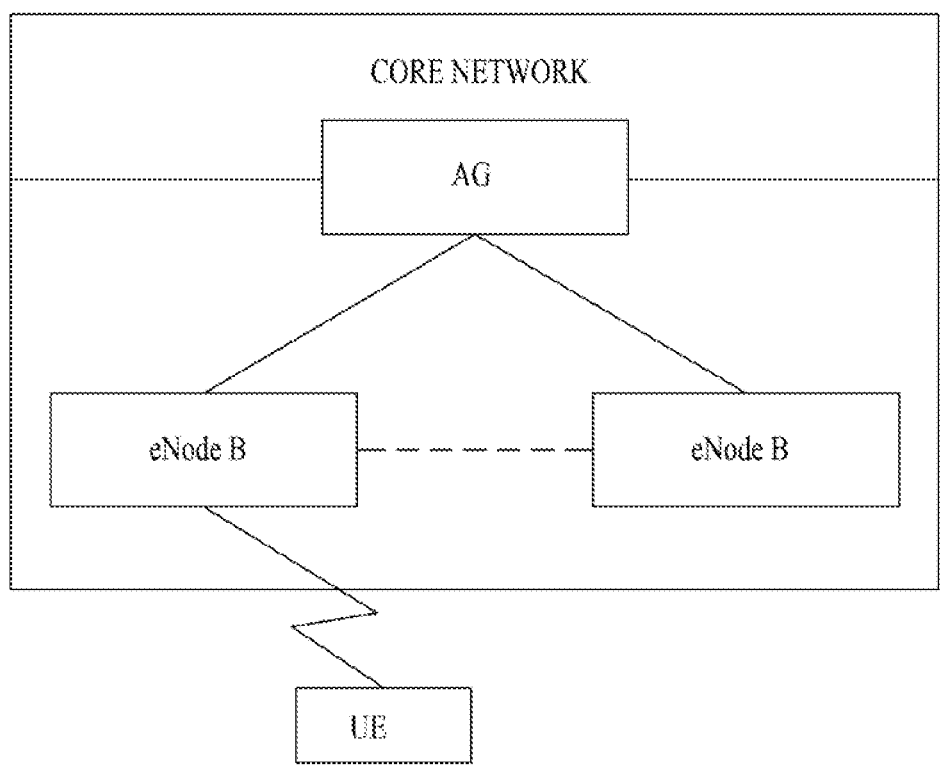
FIG. 1 is a schematic diagram of E-UMTS network structure as one example of a wireless communication system.
Figure 2:
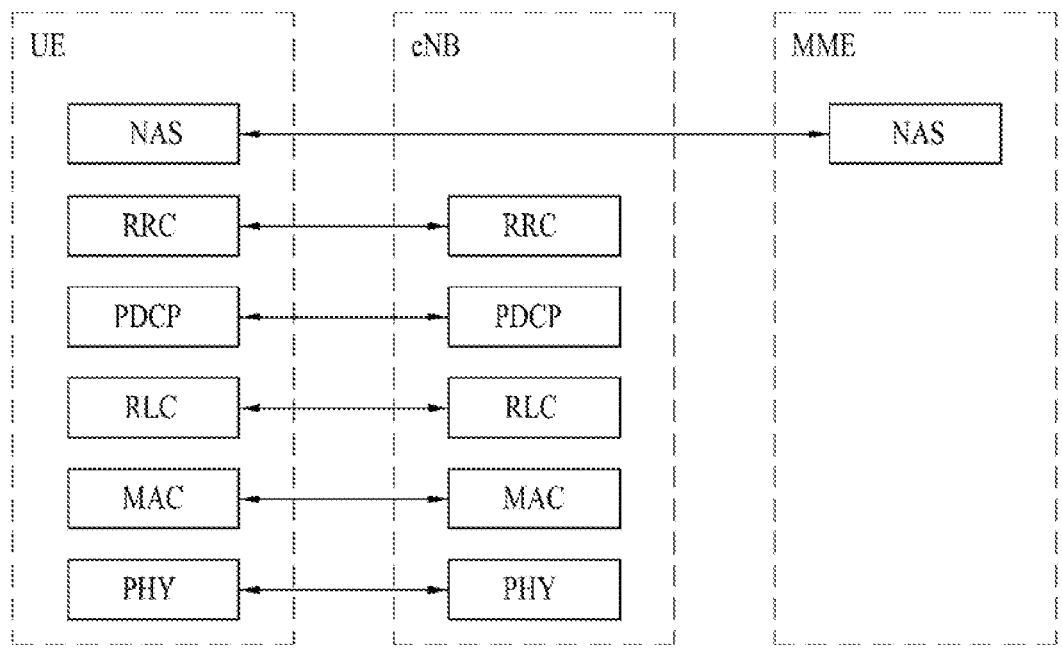
FIG. 2 is a diagram for structures of control and user planes of radio interface protocol between a 3GPP radio access network standard-based user equipment and E-UTRAN.
Figure 2:
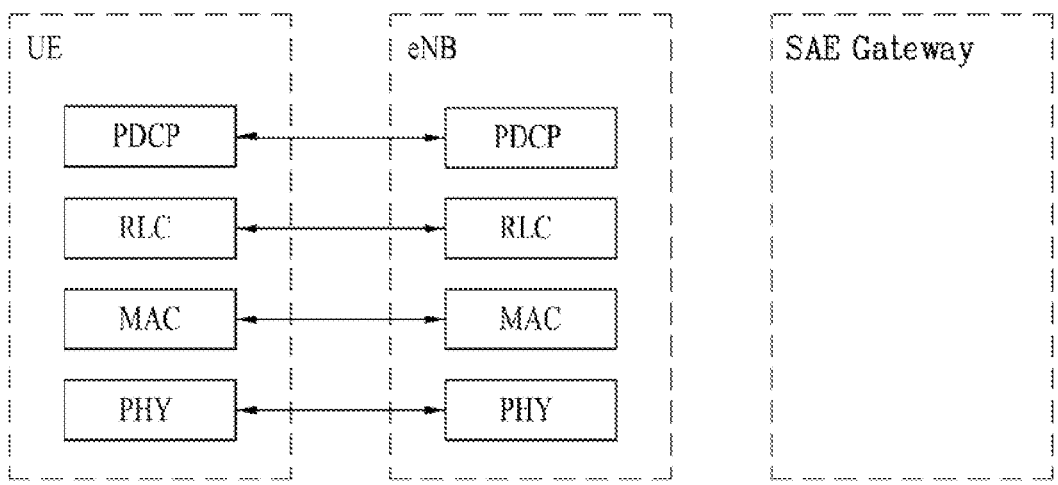

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
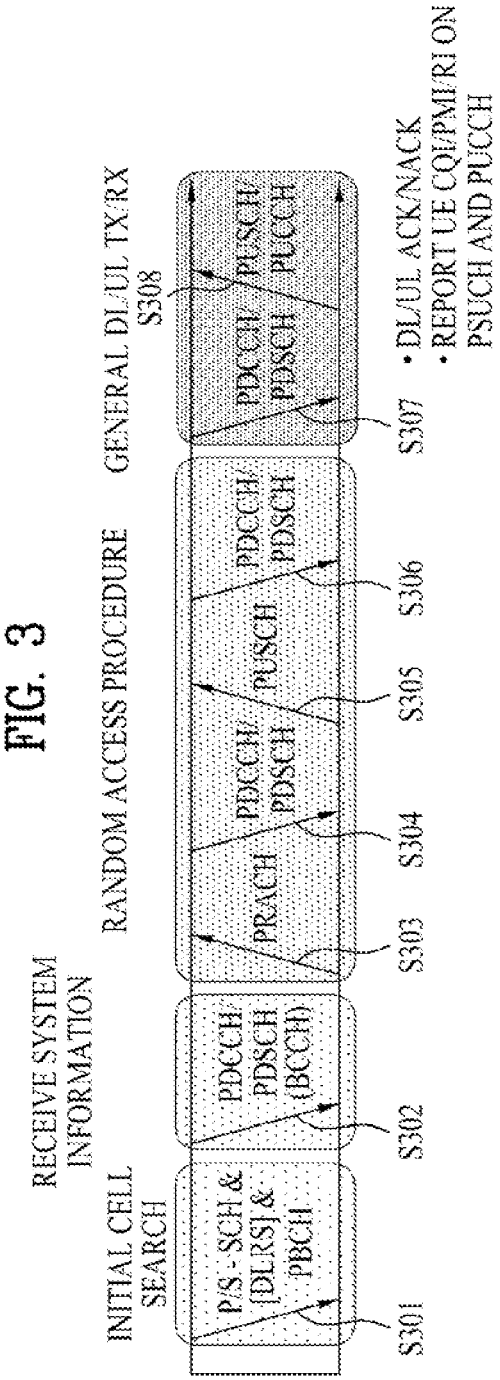
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
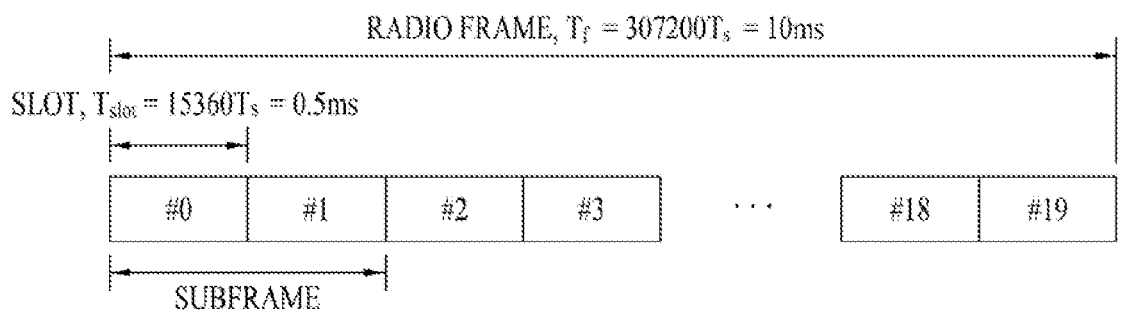
FIG. 4 is a diagram for a structure of a radio frame in LTE system.

FIG. 4 is a diagram for a structure of a radio frame in LTE system.

Referring to FIG. 4, one radio frame has a length of 10 ms (327,200×$T_S$) and is constructed with 10 subframes in equal size. Each of the subframes has a length of 1 ms and is constructed with two slots. Each of the slots has a length of 0.5 ms (15,360×$T_S$). In this case, Ts indicates a sampling time and is represented as $T_S=1/(15\ kHz \times 2048)=3.2552\times 10-8$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
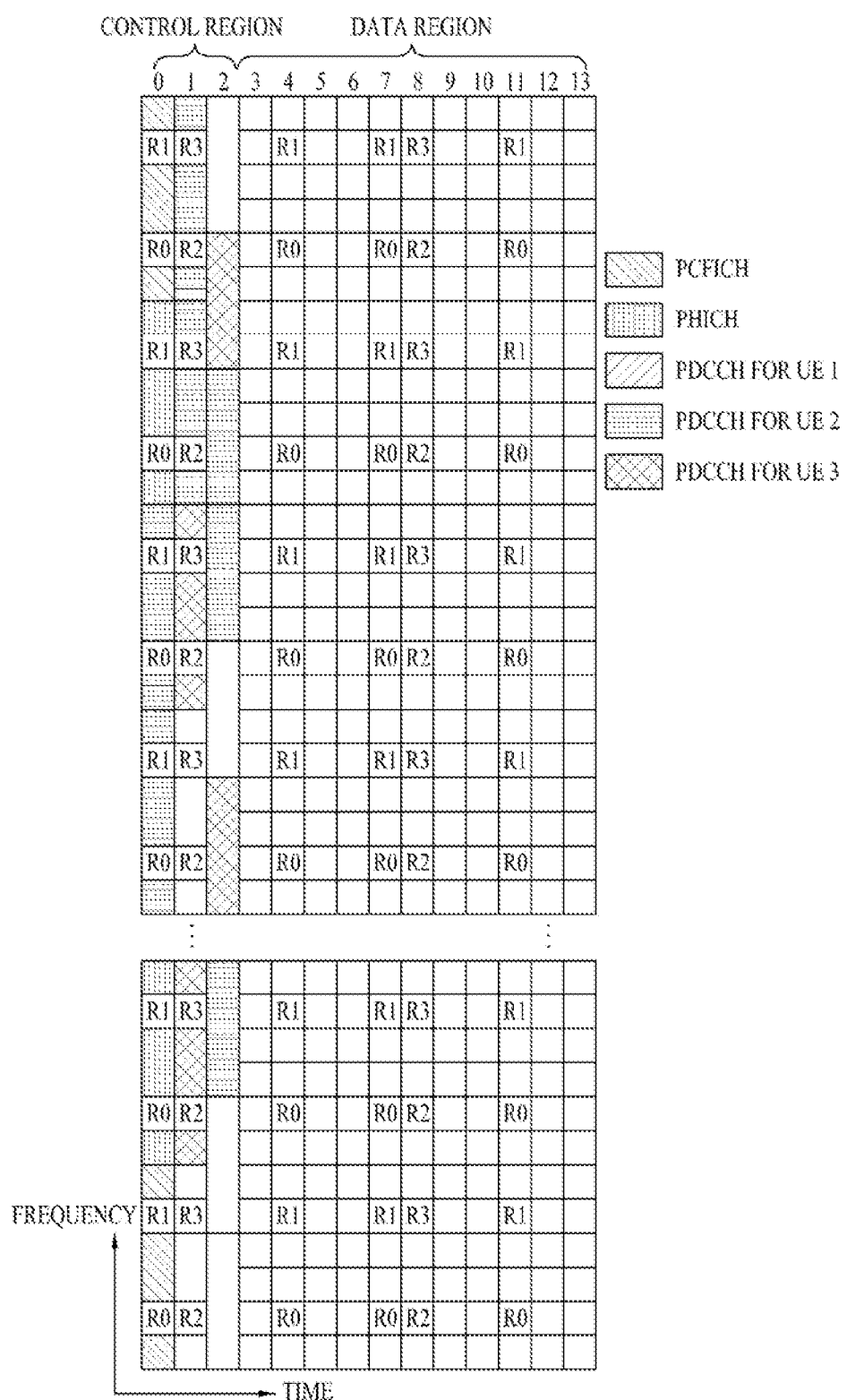
FIG. 5 is a diagram for showing an example of a control channel included in a control region of a single subframe in a DL radio frame.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control format indicator channel (PCFICH), a physical hybrid-ARQ indicator channel (PHICH), a physical downlink control channel (PDCCH), and the like.

The PCFICH (physical control format indicator channel) informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on a user equipment (one or a plurality of user equipments) receiving data of PDSCH, a method of receiving and decoding the PDSCH data performed by the user equipment, and the like is transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transport block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
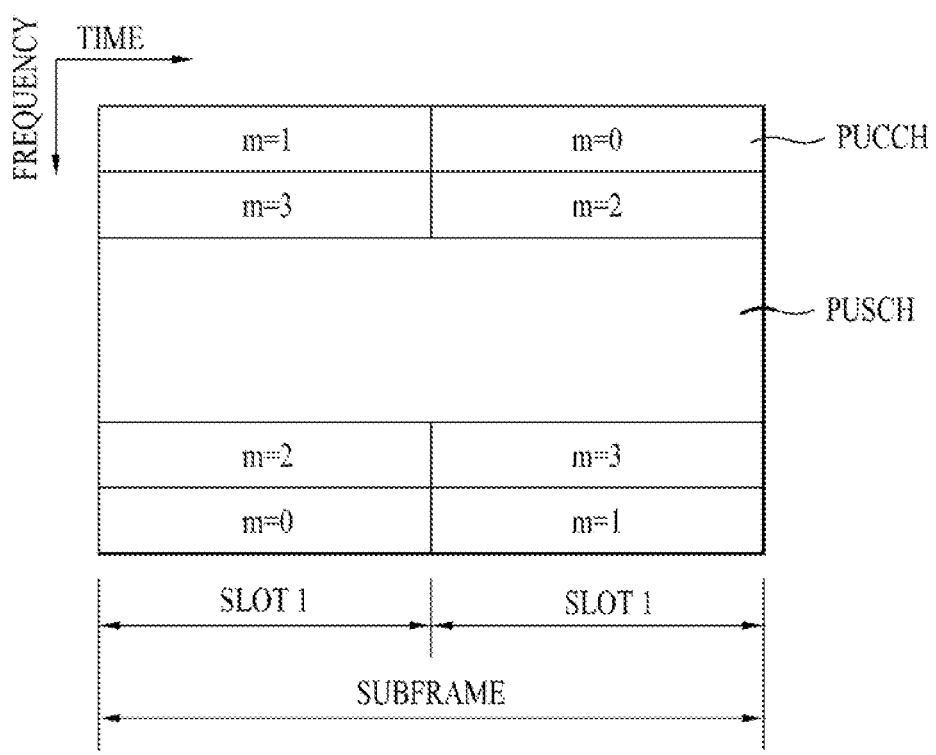
FIG. 6 is a diagram for a structure of an uplink subframe used in LTE system.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 6 shows an example that the PUCCHs satisfying conditions (e.g., m=0, 1, 2, 3) are assigned to a subframe.

In the following description, MIMO system is explained. The MIMO (multiple-input multiple-output) is a method using a plurality of transmitting antennas and a plurality of receiving antennas. The efficiency in transmitting and receiving data may be enhanced by the MIMO. In particular, by using a plurality of the antennas at a transmitting end or a receiving end in a radio communication system, it may be able to increase a capacity and enhance performance. In the following description, the MIMO may be called a 'multi antenna'.

In the multiple antenna technology, it may not depend on a single antenna path to receive a whole message. Data is completed in a manner of combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

Figure 7:
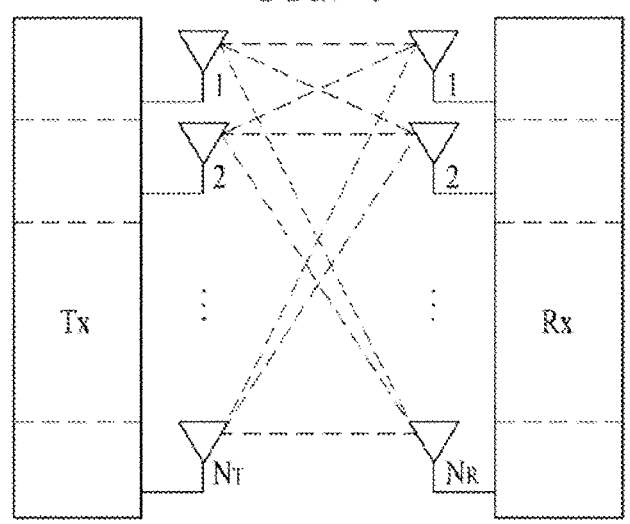
FIG. 7 is a block diagram of a general multi-antenna (MIMO) communication system.

A block diagram of a general multi-antenna (MIMO) communication system is depicted in FIG. 7. $N_T$ number of transmitting antenna is installed in a transmitting end and $N_R$ number of receiving antenna is installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as $R_o$ in case of using a single antenna, the transfer rate using multiple antennas can be theoretically increased as much as the maximum transfer rate $R_o$ multiplied by a rate of increase $R_i$, as shown in the following Formula 1. In this case, the $R_i$ is a smaller value of the $N_T$ and the $N_R$.

$$R_i = \min(N_T, N_R) \qquad \text{[Formula 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a $3^{rd}$ generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

In case of mathematically modeling a communication method of the multi-antenna system in order to explain it with more specific way, it can be represented as follows. As shown in FIG. 7, assume that there exist NT number of transmitting antenna and NR number of receiving antenna. First of all, if we look into a transmission signal, since the maximum number of information capable of being transmitted is NT in case that there exists NT number of transmitting antenna, transmission information can be represented as a vector in the following Formula 2.

$$s=[s_1, s_2, \ldots, s_{N_T}]^T \qquad \text{[Formula 2]}$$

Meanwhile, for each of the transmission informations $s_1$, $s_2$, ..., $s_{N_T}$, a transmit power may be differentiated according to the each of the transmission informations. In this case, if each of the transmit powers is represented as $P_1$, $P_2$, ..., $P_{N_T}$, transmit power-adjusted transmission information can be represented as a vector in the following Formula 3.

$$\hat{s}=[\hat{s}_1,\hat{s}_2, \ldots ,\hat{s}_{N_T}]^T=[P_1 s_1, P_2 s_2, \ldots, P_{N_T} s_{N_T}]^T \qquad \text{[Formula 3]}$$

And, if ŝ is represented using a diagonal matrix P, it can be represented as a following Formula 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Formula 4]}$$

Meanwhile, let's consider a case that the NT number of transmission signal $x_1, x_2, \ldots, x_{N_T}$, which is practically transmitted, is configured in a manner of applying a weighted matrix W to the adjusted information vector Ŝ. In this case, the weighted matrix performs a role of distributing the transmission information to each of the antennas according to the situation of the transmission channel and the like. The transmission signal $x_1, x_2, \ldots, x_{N_T}$ can be represented using a vector X in the following Formula 5. In this case, $W_{ij}$ means a weighting between an ith transmitting antenna and jth information. The W is called the weighted matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} \qquad \text{[Formula 5]}$$

$$= W\hat{s}$$

$$= WPs$$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Formula 6.

$$\text{rank}(H) \leq \min(N_T, N_R) \qquad \text{[Formula 6]}$$

And, let's define each of the informations different from each other, which are transmitted using a multi-antenna technology, as a transport stream or simply a stream. The stream can be named a layer. Then, the number of the transport stream is naturally configured not to be greater than the rank of the channel, which is a maximum number capable of transmitting informations different from each other. Hence, the channel matrix H can be represented as Formula 7 in the following.

$$\text{\# of streams rank}(H) \leq \min(N_T, N_R) \qquad \text{[Formula 7]}$$

In this case, '# of streams' indicates the number of streams. Meanwhile, in this case, it should be cautious that one stream can be transmitted via more than one antenna.

Various methods making one or more streams correspond to many antennas may exist. These methods can be described in accordance with the kind of the multi-antenna technology in the following description. A case of transmitting one stream via many antennas may be called a space diversity scheme and a case of transmitting many streams via many antennas may be called a space multiplexing scheme. Naturally, a hybrid form of the space diversity and the space multiplexing is also available.

Meanwhile, it is expected that a LTE-A system, which is a standard of a next generation mobile communication system, will support a CoMP (coordinated multi point) transmission method, which is not supported by the conventional standard, to enhance a data transmission rate. In this case, the CoMP transmission method is a transmission method for two or more base stations or cells to communicate with the user equipment in a manner of cooperating with each other to enhance a communication performance between the user equipment situated at a radio shadow zone and the base station (a cell or a sector).

The CoMP transmission method can be classified into a join processing (CoMP-joint processing, CoMP-JP) method in the form of a cooperative MIMO via data sharing and a coordinated scheduling/beamforming (CoMP-coordinated scheduling/beamforming, CoMP-CS/CB) method.

According to the joint processing (CoMP-JP) method in DL, a user equipment may be able to instantaneously receive data simultaneously from each of the base stations performing the CoMP transmission method. And, a reception performance can be enhanced in a manner of combining the signals received from each of the base stations (Joint Transmission (JT)). And, it is also possible to consider a method of transmitting a data to the user equipment on a specific timing by one of the base stations performing the CoMP transmission method (Dynamic Point Selection (DPS)). On the other hand, according to the coordinated scheduling/beamforming method (CoMP-CS/CB), the user equipment may be able to instantaneously receive data from a single base station via a beamforming.

According to the joint processing (CoMP-JP) method in UL, each of the base stations may be able to simultaneously receive PUSCH signal from the user equipment (Joint Reception (JR)). On the other hand, according to the coordinated scheduling/beamforming method (CoMP-CS/CB), only a single base station may be able to receive the PUSCH. In this case, the decision to use the coordinated scheduling/beamforming method is determined by the coordinating cells (or base stations).

In the following description, a reference signal is explained in more detail.

In general, a reference signal, which is already known to both a transmitting end and a receiving end, is transmitted from the transmitting end to the receiving end together with data to measure a channel. The reference signal plays not only a role of measuring a channel but also a role of making a demodulation process to be performed in a manner of informing the receiving end of a modulation scheme. The reference signal is classified into a dedicated reference signal (DRS) used for an eNB and a specific user equipment (i.e., UE-specific reference signal) and a cell-specific reference signal used for all UEs in a cell (i.e., common reference signal or cell specific RS (CRS)). The cell-specific reference signal includes a reference signal used for reporting CQI/PMI/RI to an eNB in a manner of measuring CQI/PMI/RI in a user equipment. This sort of reference signal is called a CSI-RS (channel state information-RS).

Figure 8:
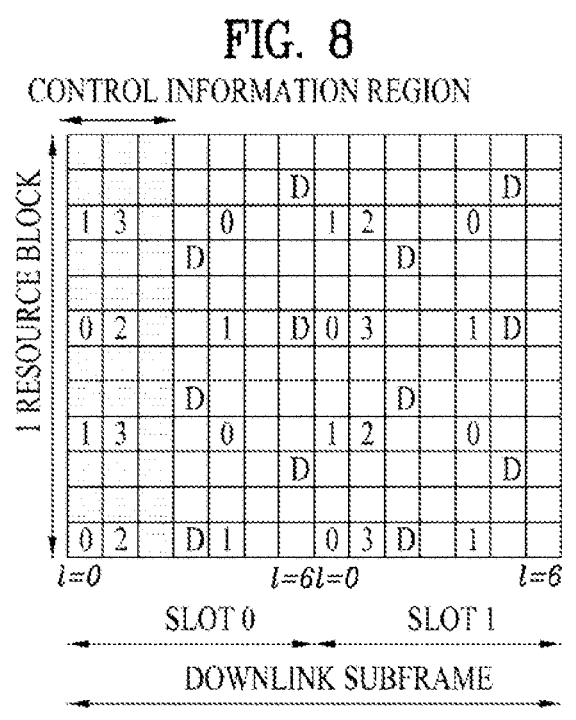
Figure 9:
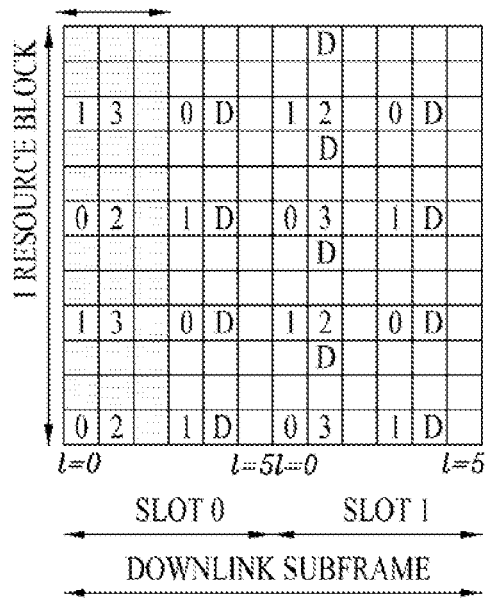

FIGS. 8 and 9 illustrate RS configurations in an LTE system supporting DL transmission through four antennas. Specifically, FIG. 8 illustrates an RS configuration in the case of a normal CP and FIG. 9 illustrates an RS configuration in the case of an extended CP.

Referring to FIG. 8 and FIGS. 9, 0 to 3 written on a grid may mean the CRS (common reference signal), which is a cell-specific reference signal, transmitted for the channel measurement and the data demodulation in a manner of corresponding to antenna port 0 to 3, respectively. The cell-specific reference signal CRS can be transmitted to a user equipment via the control information region as well as the data information region.

And, 'D' written on the grid may mean a downlink DM-RS (demodulation RS), which is a user-specific RS. The DM-RS supports a single antenna port transmission via the data region, i.e., the PDSCH. The user equipment is signaled whether the DM-RS, which is the user equipment-specific RS, exists or not via an upper layer. FIG. 8 and FIG. 9 show an example of the DM-RS corresponding to an antenna port 5. The DM-RSs corresponding to an antenna port 7 to 14, i.e., total 8 antenna ports, are also defined by 3GPP standard document 36.211.

Figure 10:
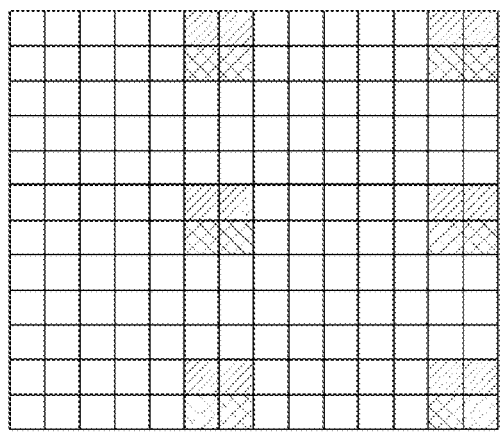
FIG. 10 is a diagram for an example of assigning a downlink DM-RS defined by a current 3GPP standard document.

FIG. 10 is a diagram for an example of assigning a downlink DM-RS defined by a current 3GPP standard document.

Referring to FIG. 10, DM-RSs corresponding to antenna ports {7, 8, 11, 13} are mapped to a DM-RS group 1 using a sequence according to an antenna port and DM-RSs corresponding to antenna ports {9, 10, 12, 14} are mapped to a DM-RS group 2 using a sequence according to an antenna port as well.

Meanwhile, the aforementioned CSI-RS is proposed to perform channel measurement for PDSCH irrespective of a CRS. Unlike the CRS, the CSI-RS can be defined by maximum 32 resource configurations different from each other to reduce inter-cell interference (ICI) in a multicell environment.

CSI-RS (resource) configuration varies according to the number of antenna ports. A CSI-RS is configured to be transmitted by different (resource) configurations between neighboring cells. Unlike the CRS, the CSI-RS supports maximum 8 antenna ports. According to 3GPP standard document, total 8 antenna ports (antenna port 15 to antenna port 22) are assigned as the antenna port for the CSI-RS. [Table 1] and [Table 2] list CSI-RS configurations defined in the 3GPP standard. Specifically, [Table 1] lists CSI-RS configurations in the case of a normal CP and [Table 2] lists CSI-RS configurations in the case of an extended CP.

TABLE 1

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 | | | | | | |
| 0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| 9 | (6, 4) | 0 | | | | |
| 10 | (2, 4) | 0 | | | | |
| 11 | (0, 4) | 0 | | | | |
| 12 | (7, 4) | 1 | | | | |
| 13 | (6, 4) | 1 | | | | |
| 14 | (1, 4) | 1 | | | | |
| 15 | (0, 4) | 1 | | | | |
| Frame structure type 2 only | | | | | | |
| 16 | (11, 1) | 1 | (11, 1) | 1 | (11, 1) | 1 |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

Figure 11:
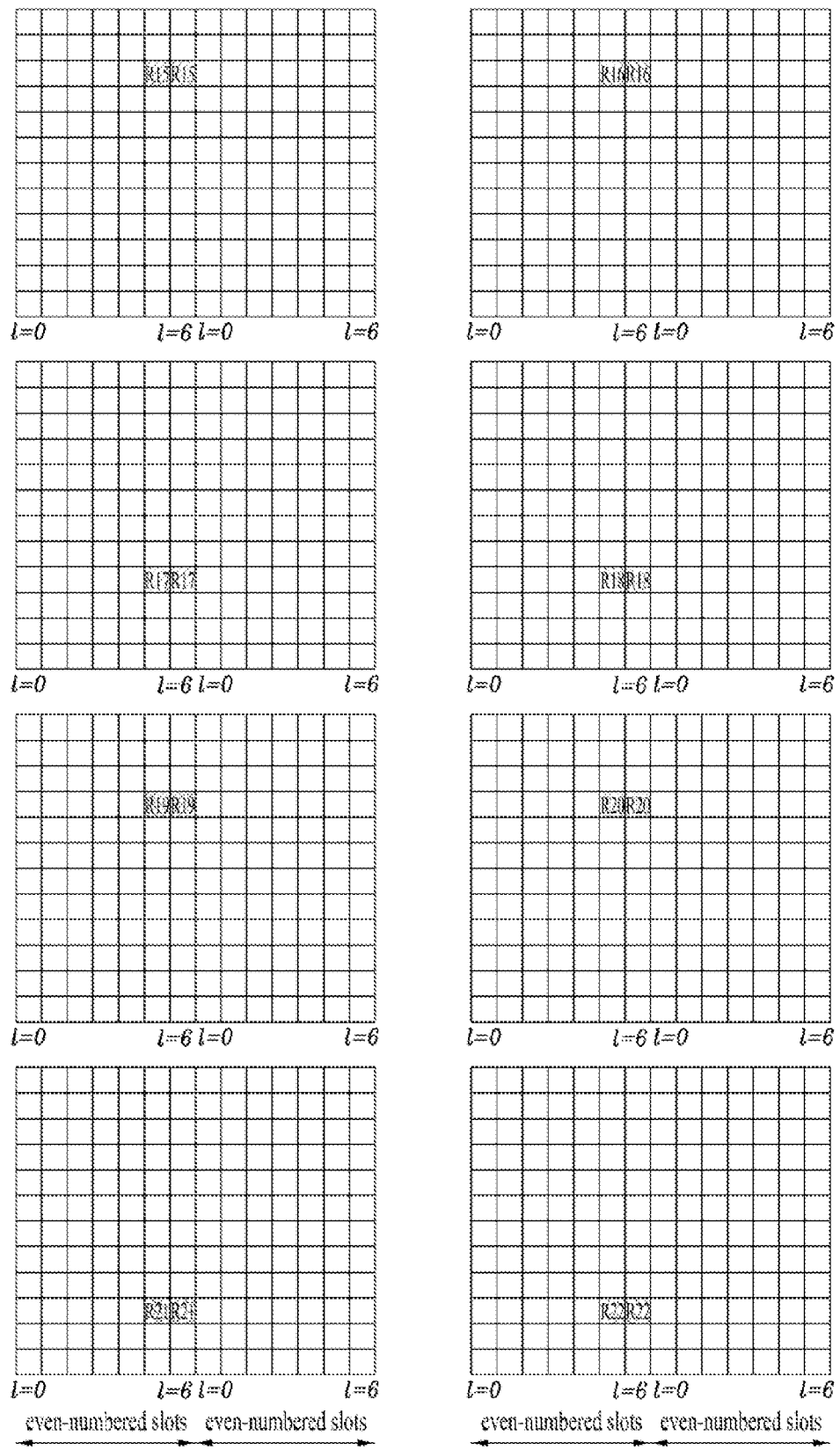
FIG. 11 illustrates CSI-RS configuration #0 of DL CSI-RS configurations defined in the current 3GPP standard.

In [Table 1] and [Table 2], (k', l') represents an RE index where k' is a subcarrier index and l' is an OFDM symbol index. FIG. 11 illustrates CSI-RS configuration #0 of DL CSI-RS configurations defined in the current 3GPP standard.

In addition, CSI-RS subframe configurations may be defined, each by a periodicity in subframes, $T_{CSI-RS}$ and a subframe offset $\Delta_{CSI-RS}$ [Table 3] lists CSI-RS subframe configurations defined in the 3GPP standard.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Meanwhile, interference measurement resource (IMR) refers to a set of REs that are designated by an eNB in order to measure interference to be used for calculation of specific CSI. That is, the eNB pre-designates a predetermined RE set as IMR via a higher layer signal such as RRC and commands calculation and appropriate report of specific CSI based on the measured interference.

REs belonging to one IMR configuration may be assumed to be the same interference situation and measurement values of the REs may be combined. Here, the same interference situation refers to a situation configured to equalize configurations of precoding, transmission power allocation, or the like in the corresponding REs by transmission points (TPs) that effectively interfere in a corresponding UE or to prevent significant errors in CSI measurement from being caused even if the configurations are slightly different and the configures are considered to be the same due to a limited width between differences. In addition, it may be possible to configure a plurality of IMR configurations to one UE in order to calculate CSI in different interference situations by one UE.

Separate IMR may be configured in the same form as a resource occupied by CSI-RS used for channel estimation, and preferably, may be configured in the form of zero power CSI-RS used to protect CSI-RS of an adjacent TP.

Figure 12:
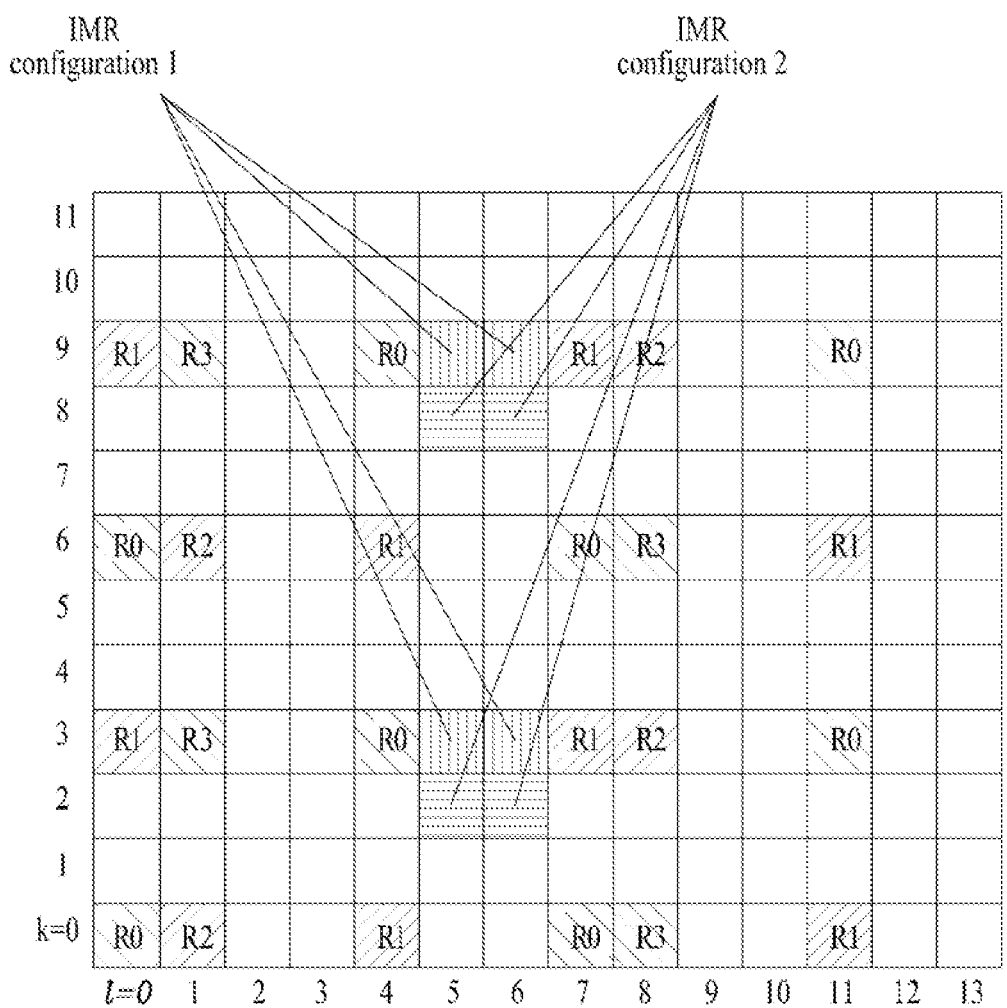
FIG. 12 is a diagram illustrating an example of configuration of two interference measurement resources (IMRs).

FIG. 12 is a diagram illustrating an example of configuration of two interference measurement resources (IMRs). Specifically, FIG. 12 illustrates an example of two IMRs in the form of zero-power CSI-RS having four antenna ports in a specific subframe.

Information about a Zero Power (ZP) CSI-RS is transmitted in a CSI-RS-Config-r10 message configured as illustrated in [Table 4] by RRC layer signaling. Particularly, a ZP CSI-RS resource configuration includes zeroTxPowerSubframeConfig-r10 and a 16-bit bitmap, zeroTxPowerResourceConfigList-r10. zeroTxPowerSubframeConfig-r10 indicates the CS-RS transmission periodicity and subframe offset of a ZP CSI-RS by $I_{CSI-RS}$ illustrated in [Table 3]. zeroTxPowerResourceConfigList-r10 indicates a ZP CSI-RS configuration. The elements of this bitmap indicate the respective configurations written in the columns for four CSI-RS antenna ports in [Table 1] or [Table 2]. That is, the current 3GPP standard defines a ZP CSI-RS only for four CSI-RS antenna ports.

TABLE 4

-- ASN1START
CSI-RS-Config-r10 ::=      SEQUENCE {
   csi-RS-r10             CHOICE {
      ...
   }

TABLE 4-continued

```
zeroTxPowerCSI-RS-r10         CHOICE {
    release                       NULL,
    setup                         SEQUENCE {
        zeroTxPowerResourceConfigList-r10   BIT STRING
                                            (SIZE (16)),
        zeroTxPowerSubframeConfig-r10       INTEGER (0..154)
    }
  }
}
-- ASN1STOP
```

A CQI is calculated based on interference measurement as follows. For reference, the current 3GPP standard defines modulation orders and cording rates for respective CQI indexes as illustrated in [Table 5].

TABLE 5

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Accordingly, a UE needs to measure a Signal to Interference and Noise Ratio (SINR) for CQI calculation. In this case, the UE may measure the reception power (S-measure) of a desired signal in an RS such as a Non-Zero Power (NZP) CSI-RS. For interference power measurement (I-measure or Interference Measurement (IM)), the UE measures the power of an interference signal resulting from eliminating the desired signal from a received signal.

CSI measurement subframe sets $C_{CSI,0}$ and $C_{CSI,1}$ are configured by higher-layer signaling and the subframes of each subframe set and subframes corresponding to respective subframe sets do not overlap and are included in only one set. In this case, the UE may perform S-measure in an RS such as a CSI-RS without any specific subframe constraint. However, the HE should calculate CQIs separately for the CSI measurement subframe sets $C_{CSI,0}$ and $C_{CSI,1}$ through separate I-measures in the CSI measurement subframe sets $C_{CSI,0}$ and $C_{CSI,1}$.

The present invention proposes a method of performing coordinated scheduling (CS) and coordinated beamforming (CB) among CoMP schemes using interference measurement resource configuration for the aforementioned I-measure.

The CS/CB operation may be performed based on. CSI that can be achieved by a UE of a TP (hereinafter, interfered TP) that is interfered when an interfering TP (hereinafter, interfering TP) performs specific scheduling and beamforming. For example, a UE of the interfered TP may report CSIs when the interfering TP applies beamforming #1 and beamforming #2 respectively, and the interfering TP may select beamforming with lower interference among the two beamforming, which will be described with reference to the drawings.

Figure 13:
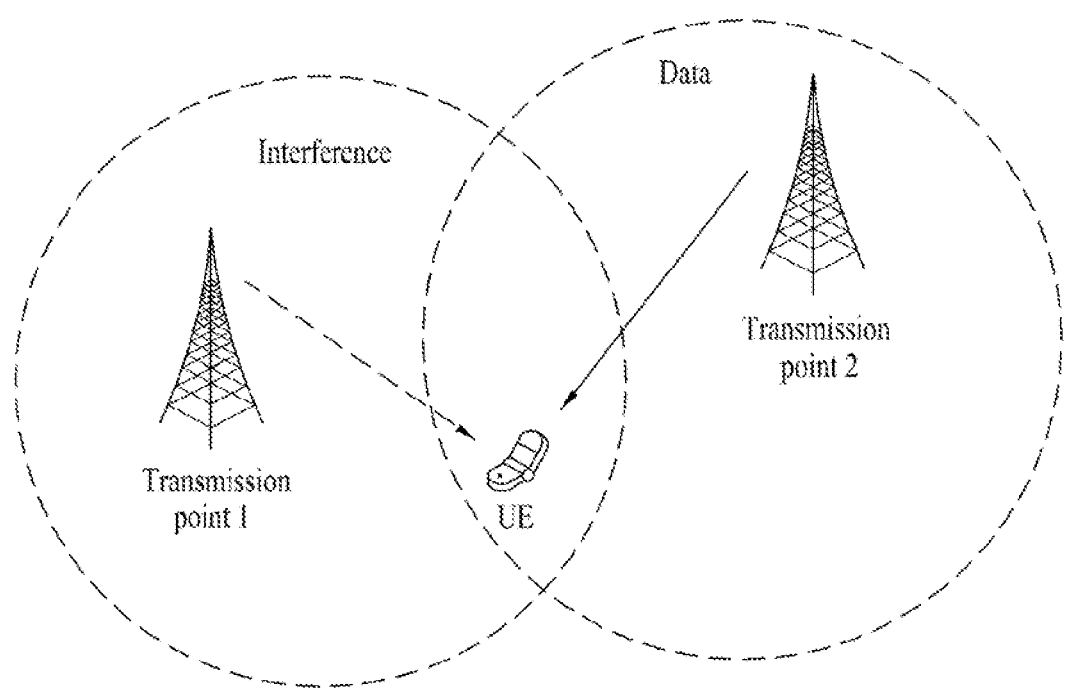
FIG. 13 is a diagram for explanation of a CS/CB operation using IMR according to an embodiment of the present invention.

FIG. 13 is a diagram for explanation of a CS/CB operation using IMR according to an embodiment of the present invention. In particular, FIG. 13 assumes that TP #1 interferes in a UE connected to TA #2, that is, TP #1 is an interfering TP and TP #2 is an interfered TP.

First, a network configures a plurality of IMRs for a UE of TP #2 as an interfered TP and TP #1 as an interfering TP maintains predetermined scheduling/beamforming in each IMR. In addition, a UE of TP #2 measures interference in each IMR, calculates a plurality of CSIs based on the measured interference, and reports the calculated CSIs to the network through TP #2. Lastly, the network finally determines CS/CB of TP #1 and TP #2 based on the reported CSI.

Here, it is important to maintain predetermined scheduling/beamforming in each IMR by TP #1 as an interfering TP. However, in general, IMR is configured over an entire system band rather than being limited to a specific band so as to measure interference in any frequency band. On the other hand, the amount of data to be transmitted by each TP at a specific point of time and a target UE are changed, and thus a specific TP has difficulty in maintaining predetermined scheduling/beamforming in an entire band during downlink data transmission of the TP.

For example, when data to be transmitted at a specific point of time is barely present, if only a very small amount of resource is used, interference to an adjacent UE is reduced, but if a large amount of data is transmitted at another point of time, interference to the adjacent UE is very high. In addition, since the type of a UE that receives data every time and a frequency band occupied by each UE are also changed, it is also difficult to maintain precoding used in each frequency band.

In order to overcome this problem, in a resource configured as IMR for a UE that is interfered, that is, an interfered UE, an interfering TP may transmit a signal that does not contain actual information according to a CS/CB operation as a CoMP scheme to be performed instead of transmitting downlink data. That is, the interfering TA may transmit a signal having properties representing interference to be caused by scheduling/beamforming that is likely to be used from now on by the interfering TP, to a specific RE, and an adjacent UE, that is, an interfered UE calculates and reports CSI to be achieved by the adjacent UE when a corresponding TP performs specific scheduling/beamforming by measuring the signal as interference. In other words, the interfering TP transmits a signal used only for interference measurement without information in an RE corresponding to IMR of the interfered UE.

In particular, the interfering TP may notify UEs connected to the interfering TP of information indicating that an adjacent UE configures a resource configured as IMR, as a resource to which a PDSCH is not mapped, for example, ZP CSI-RS for a UE of the interfering TP. Then UEs connected to the interfering TP do not attempt to detect the PDSCH in a corresponding resource, and thus the interfering TP does not have constraints of scheduling/beamforming to be used in the corresponding RE. That is, it may be possible to independently transmit a signal from scheduling/beamforming that is actually used for PDSCH transmission of the interfering TP.

Figure 14:
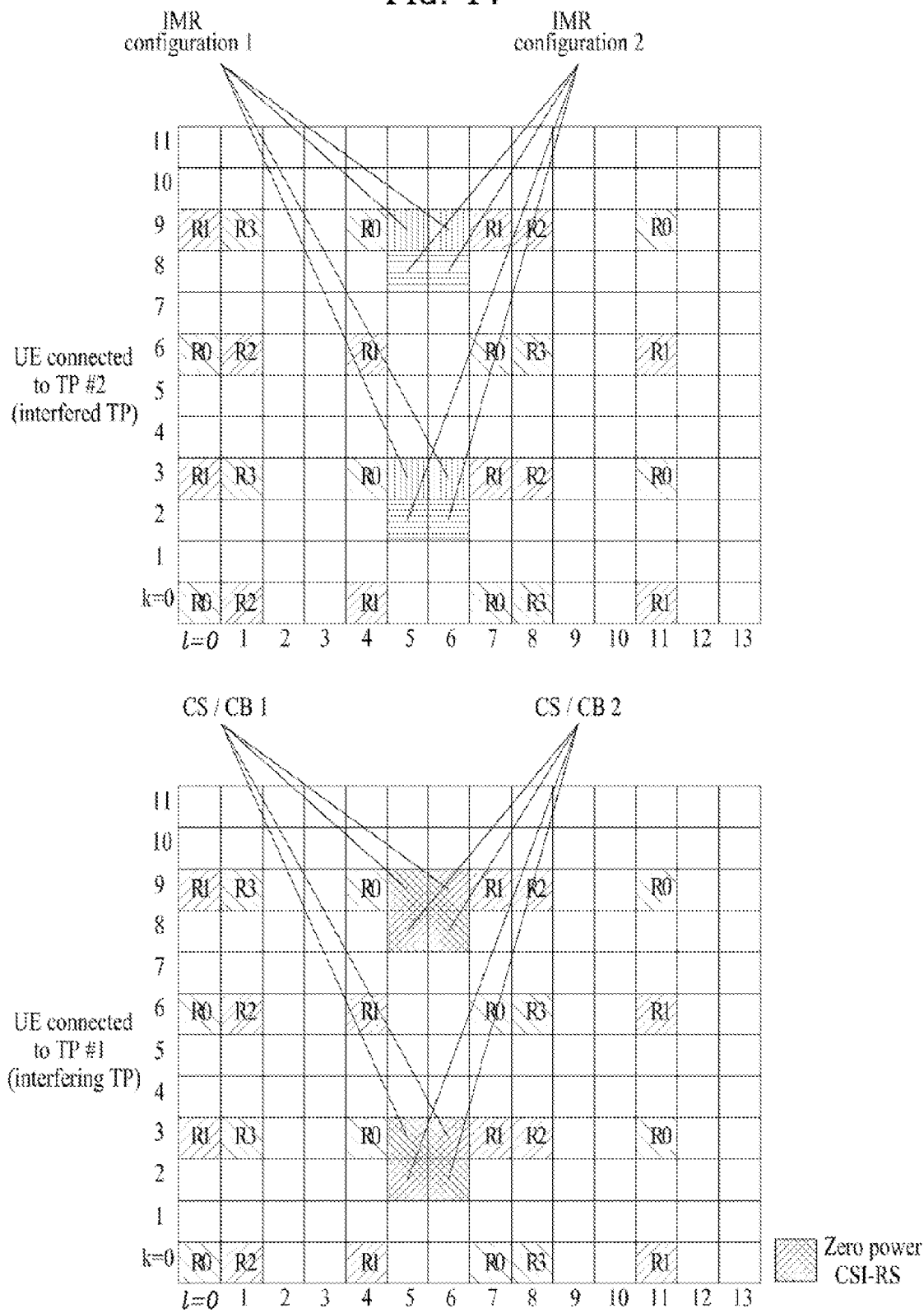
FIG. 14 is a diagram of an example of a scheduling/beamforming operation according to an embodiment of the present invention.

FIG. 14 is a diagram of an example of a scheduling/beamforming operation according to an embodiment of the present invention. In particular, FIG. 14 assumes that TA #1 interferes in a UE connected to TP #2, that is, TP #1 is an interfering TP and TP #2 is an interfered TP like in FIG. 13.

Referring to FIG. 14, TP #1 as an interfering TP may notify UEs connected to TP #1 of information indicating that a UE of TP #2 as an interfered TP configures resources (IMR configuration #1 and IMR configuration #2 in FIG. 14) configured as IMR, as ZP CSI-RS for a UE of the interfering TP. That is, TP #1 may notify the UEs of TP #1 of information about an upper pattern of FIG. 14.

Then UEs connected to TP #1 do not attempt to detect a PDSCH in a corresponding resource, and thus TP #1 may transmit a signal based on scheduling/beamforming #1 in REs corresponding to IMR configuration #1 and transmit a signal based on scheduling/beamforming #2 in REs corresponding to IMR configuration #2.

Figure 15:
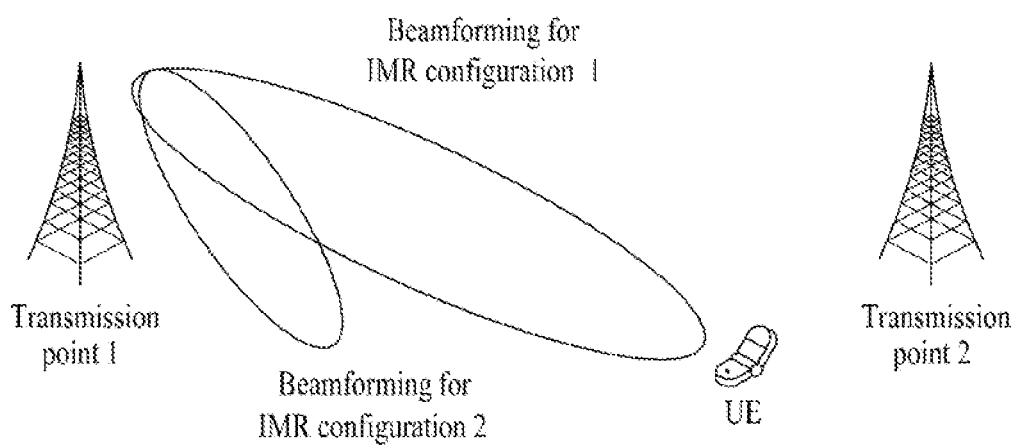
FIG. 15 is a diagram of an operation for adjusting interference to an interfered TP by adjusting a position of a target of beamforming according to an embodiment of the present invention.

FIG. 15 is a diagram of an operation for adjusting interference to an interfered TP by adjusting a position of a target of beamforming according to an embodiment of the present invention. In particular, FIG. 15 illustrates an example in which TP #1 changes beamforming targets of IMR configuration #1 and IMR configuration #2 in the situation of FIG. 14.

As seen from FIG. 15, a beam is also formed with respect to UEs positioned outside a TP in IMR configuration #1, but a beam is formed to be concentrated on UEs positioned in the TP in IMR configuration #2.

In addition, TP1 and TP2 may share, via backhaul link, information indicating that beamforming is performed for IMR configuration #1 in a first subframe (set) and is performed for IMR configuration #2 in a second subframe (set).

Through the aforementioned operation, a UE can measure a predetermined level of interference in each IMR, and accordingly, it may be possible to calculate and report CSI in each interference situation based on the measured interference.

In the case of FIG. 13, TP #2 that receives the CSI can recognize CSI to be achieved by a corresponding UE in a resource in which TP #1 performs specific scheduling/beamforming, and thus appropriate scheduling/beamforming is possible. When a backhaul link state between TP #1 and TP #2 is very satisfactory, and thus TP #2 can recognize scheduling/beamforming of TP #1 in each PDSCH resource in real time, scheduling/beamforming is possible via only the aforementioned CSI report for each IMR.

However, when it is impossible to exchange scheduling/beamforming information by two TPs in real time due to design problems of a backhaul link, information about a resource in which CSI for each IMR can be used is additionally required. That is, in terms of TP #2, in order to use CSI obtained by performing specific scheduling/beamforming on a specific IMR by TP #1, TP #2 needs to know a resource in which TP #1 will perform corresponding scheduling/beamforming. Hereinafter, a method for determining a position of a resource in which CSI obtained on the specific IMR can be used will be described in detail.

First, the interfering TP pre-notifies the interfered TP of a set of REs in which the interfering TP performs a predetermined level of scheduling/beamforming and recommends the interfered TP to set the resource as one IMR. In this case, the interfering TP may further notify the interfered TP of PDSCH allocation time/frequency resources in which CSI measured using each RE set, that is, in which the same level of interference as interference measured in each RE set can be assumed, which can be interpreted as if the interfering TP notifies the interfered TP of a correlation between an RE set recommended as IMR by the interfering TP and a set of a series of time/frequency resources to which downlink data can be allocated.

For example, while designating two CSI-RS configurations recommended as IMR and notifying TP #2 of the designated CSI-RS configurations, TP #1 designates a resource set 1 and resource set 2 via separate signaling and further notifies TP #2 of information indicating that interference in each of the resource sets 1 and 2 can be assumed to be the same as interference observed in each CSI-RS configuration recommended as IMR. TP #2 that receives the information may configure two IMRs for a UE using the two designated CSI-RS configurations and use CSI calculated from each IMR in scheduling in the resource set 1 and the resource set 2.

As an example of a set of a series of time/frequency resources to be allocated as the downlink data, the interfering TP may indicate information in the form of bitmap indicating a set of a series of subframes or indicate information in the form of bitmap indicating a set of a series of sub-bands or PRBs. Alternatively, the interfering TP may indicate information in the form such as a set of PRBs or specific sub-bands in a specific subframe set via a combination of the two bitmaps.

In particular, the interfering TP may designate a specific time/frequency resource set and indicate to assume that interference with attribute irrelevant to measured in IMR in the corresponding resource is exerted on a UE belonging to an adjacent TP, and this resource can be used as a resource yin which a corresponding TP freely performs scheduling/beamforming g according to a traffic situation of the TP irrespective of a CoMP operation. As such, the resource in which a specific TP freely performs scheduling/beamforming may be indicated as a resource without correlation with IMR.

When a downlink data resource set associated with a specific IMR is indicated by a set of a series of subframes, additional assumption and signaling may be necessary according to how interference measured in IMR acts in the frequency domain of an actual data resource in terms of a TP of an interfered UE.

For example, when information indicating that interference measured in IMR configuration #1 is effective in subframe set #1 is known, it is not clear that interference measured in each sub-band of IMR configuration #1 can be assumed to be the same as interference of each sub-band of subframe set #1.

When this assumption is possible, if the interfered UE performs sub-band CSI report, the interfered UE may measure interference for each sub-band to calculate CSI, and a TP that receives the report may perform scheduling obtained by considering a sub-band-specific interference situation. In this case, interfering TP #1 can perform different scheduling such as different transmission power allocation for each sub-band in an RE set recommended as IMR and TP #2 can also perform scheduling/beamforming in consideration of interference characteristic from TP #1 observed for each sub-band in this situation.

On the other hand, when interference measured in each sub-band of a specific IMR cannot be assumed to be the same as interference of a sub-band of actual data transmission resource, this means that only wideband measurement obtained by averaging interferences measured in all sub-bands and measuring interference on each resource is effective as interference measurement in IMR, and a TP that transmits data to the interfered UE assumes that sub-bands in an associated subframe set are not different in terms of at least interference between TPs and performs scheduling. However, signal components except for interference are still different for respective sub-bands, and thus it is still meaningful to measure and report CSI for each sub-band by a corresponding UE. Thus, in this case, upon performing sub-band measurement, the UE may perform sub-band measurement on the signal components, perform wideband measurement on the interference component, combine the components, and operate to measure/report CSI of each sub-band.

However, even if interference at a sub-band level of IMR is not the same as interference at a sub-band level of data transmission resource, the non-homogeneity may be restricted to some interference properties such as precoding and homogeneity of other properties such as interference power may be maintained.

As such, various assumptions may be possible according to a correlation between subframe sets associated with IMR, and thus the interfering TP may further transmit a signal indicating a correlation between IMR at a sub-band level and the subframe set via a backhaul link. In addition, the signaling may also be transmitted to a UE to indicate whether interference measurement is performed in a sub-band or a wideband. Alternatively, it may be assumed that only one assumption of the aforementioned assumptions is effective without separate signaling.

As described above, when a specific resource set is associated with a set IMR, interference information can be recognized without conventionally designed interference coordination. Accordingly, information coordination between TPs defined for the conventional interference coordination may be interpreted as being limited and applied to a resource set that is not associated with IMR. For example, when TP #1 transmits a relative narrowband transmit power (RNTP) message indicating that downlink transmission power is reduced in a specific frequency resource to TP #2 and simultaneously indicates a resource set associated with a specific IMR, the RNTP message is interpreted as downlink transmission power allocation information in the time/frequency resources that are not associated to any IMR. That is, when the specific time/frequency resources are not associated with any IMR, this may correspond to a condition in which the RNTP message is effective in the corresponding resource.

Figure 16:
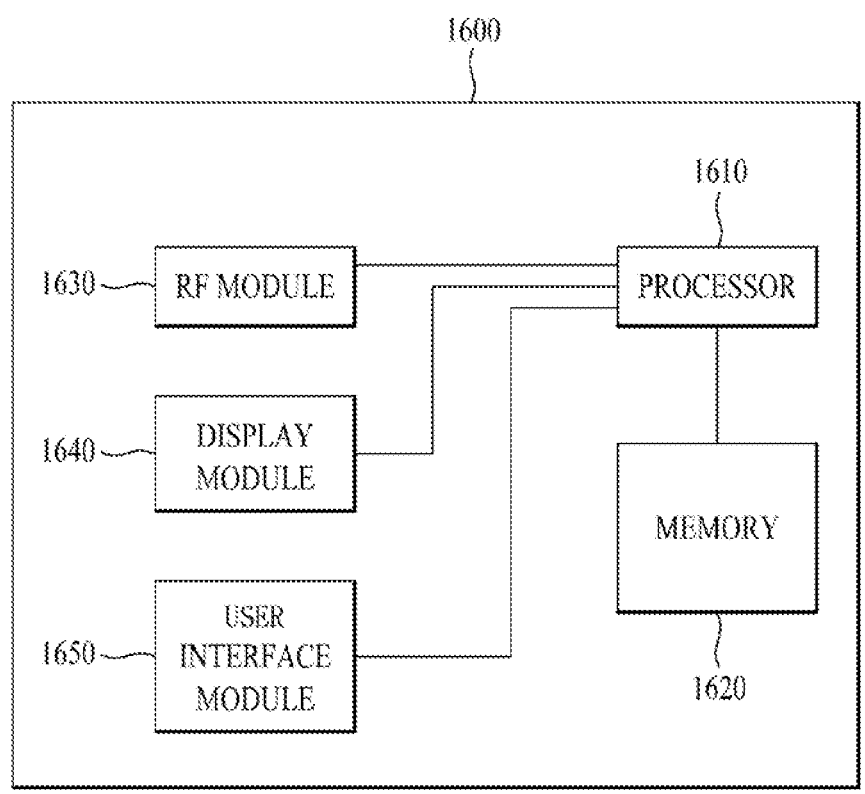
FIG. 16 is a block diagram for an example of a communication device according to one embodiment of the present invention.

FIG. 16 is a block diagram for an example of a communication device according to one embodiment of the present invention.

Referring to FIG. 16, a communication device 1600 may include a processor 1610, a memory 1620, an RF module 1630, a display module 1640, and a user interface module 1650.

Since the communication device 1600 is depicted for clarity of description, prescribed module(s) may be omitted in part. The communication device 1600 may further include necessary module(s). And, a prescribed module of the communication device 1600 may be divided into subdivided modules. A processor 1610 is configured to perform an operation according to the embodiments of the present invention illustrated with reference to drawings. In particular, the detailed operation of the processor 1610 may refer to the former contents described with reference to FIG. 1 to FIG. 15.

The memory 1620 is connected with the processor 1610 and stores an operating system, applications, program codes, data, and the like. The RF module 1630 is connected with the processor 1610 and then performs a function of converting a baseband signal to a radio signal or a function of converting a radio signal to a baseband signal. To this end, the RF module 1630 performs an analog conversion, amplification, a filtering, and a frequency up conversion, or performs processes inverse to the former processes. The display module 1640 is connected with the processor 1610 and displays various kinds of informations. And, the display module 1640 can be implemented using such a well-known component as an LCD (liquid crystal display), an LED (light emitting diode), an OLED (organic light emitting diode) display and the like, by which the present invention may be non-limited. The user interface module 1650 is connected with the processor 1610 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

While the method and apparatus for transmitting and receiving a signal via interference measurement in a wireless communication system with cooperative base stations have been described above in the context of a 3GPP LTE system, the present invention is also applicable to various wireless communication systems other than the 3GPP LTE system.

The invention claimed is:

1. A method for transmitting, by a first base station (BS), a data for a first user equipment (UE) served by the BS in a wireless communication system, the method comprising:

receiving information about a first interference measurement resource (IMR) and a second IMR from a second BS, wherein the first and the second IMRs do not overlap each other;

transmitting a first dummy signal in the first IMR by applying a first beamforming and a second dummy signal in the second IMR by applying a second beamforming;

receiving a first channel state information (CSI) report associated with the first dummy signal and a second CSI report associated with the second dummy signal from a second UE served by the second BS;

selecting a beamforming with lower interference among the first and the second beamformings in consideration of the first and the second CSI reports; and transmitting the data for the first UE in a data transmission resource by applying the selected beamforming, wherein the data transmission resource does not overlap with both of the first and the second IMRs.

2. The method according to claim 1, wherein the first and the second beamformings are applied in different directions and different ranges.

3. The method according to claim 1, further comprising commanding the first UE to avoid detecting the data in both of the first and the second IMRs.

4. The method according to claim 1, further comprising transmitting information about the data transmission resource to the second BS, wherein the second BS assumes that interference level in the data transmission resource is same as interference level in an IMR with lower interference among the first and the second IMRs.

5. The method according to claim 4, further comprising transmitting information about whether interference at a sub-band level of the data transmission resource is assumed to be the same as interference at a sub-band of the IMR with lower interference among the first and the second IMRs.

6. The method according to claim 4, wherein the information about the data transmission resource comprises sub-frame pattern information.

7. The method according to claim 1, wherein:
the first BS is a transmission point that causes interference; and
the second BS is an interfered transmission point.

8. The method according to claim 1, wherein the first and the second IMRs are resources for zero power channel state information-reference signal (CSI-RS).

9. The method according to claim 1, wherein the information about the first and the second IMRs is received via a backhaul link with the second BS.

* * * * *